United States Patent [19]

Ohtani et al.

[11] Patent Number: 4,786,996
[45] Date of Patent: Nov. 22, 1988

[54] CASSETTE TAPE WITH GUIDERAILS ON CASSETTE HOLDER APPARATUS

[75] Inventors: Yuzo Ohtani; Sachio Ueda, both of Kanagawa, Japan

[73] Assignee: Sony Corporation, Tokyo, Japan

[21] Appl. No.: 31,550

[22] Filed: Mar. 30, 1987

[51] Int. Cl.$^4$ .................. G11B 5/008; G11B 15/00; G11B 17/00
[52] U.S. Cl. ........................ 360/94; 360/132
[58] Field of Search .......... 360/92, 94, 132, 93, 360/90, 91; 242/197–201

[56] References Cited

U.S. PATENT DOCUMENTS

| | | | |
|---|---|---|---|
| 3,703,295 | 11/1972 | Yamamoto et al. | 360/94 |
| 3,735,939 | 5/1973 | Inaga | 360/132 |
| 4,008,490 | 2/1977 | Lemelson | 360/94 |
| 4,093,149 | 6/1978 | Shroff et al. | 360/132 |
| 4,268,877 | 5/1981 | Moris et al. | 360/94 |

Primary Examiner—Stuart N. Hecker
Assistant Examiner—David J. Severin
Attorney, Agent, or Firm—Alvin Sinderbrand

[57] ABSTRACT

A large-sized tape cassette has a width, measured in a transverse direction, larger than the similarly measured width of a standard, relatively small-sized tape cassette and, for the purpose of being adapted to be selectively loaded, in place of the standard cassette, into a tape cassette recording and/or reproducing, the large-sized tape cassette has a bottom surface with a plurality of grooves therein extending at right angles to the transverse direction and spaced from each other by a distance equal to the width of the standard, relatively small-sized cassette, and the apparatus includes a cassette holder having a pair of parallel guide rails spaced apart for slidable reception in the grooves of the large-sized cassette or for slidable engagement of confronting surfaces of the guide rails with side surfaces of the standard, small-sized cassette.

5 Claims, 5 Drawing Sheets

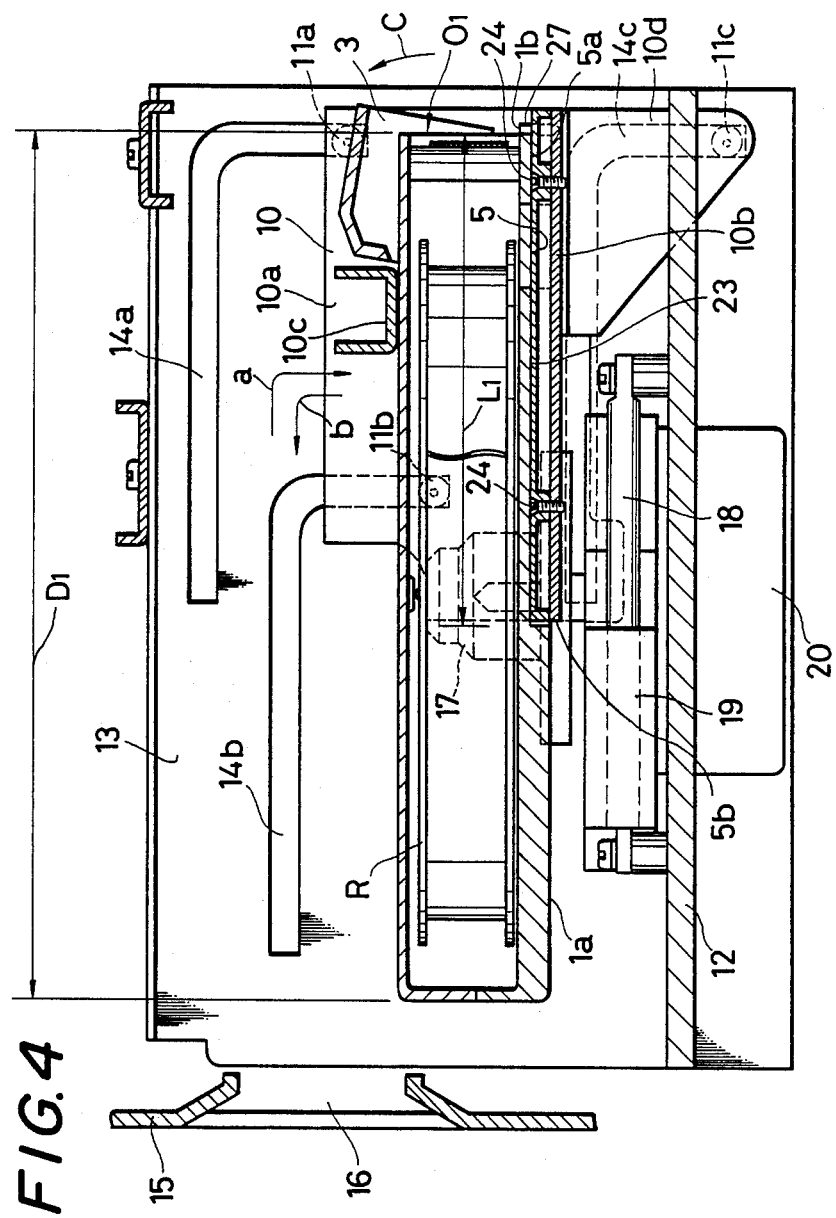

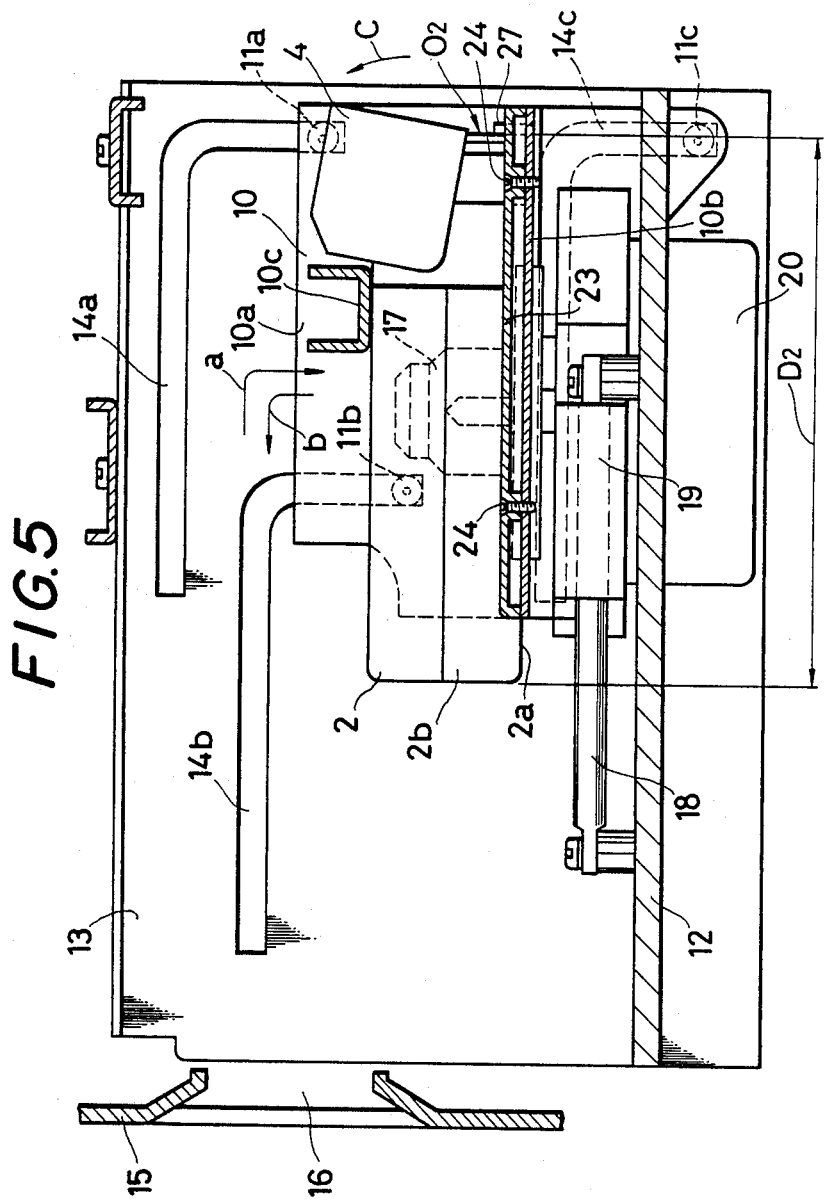

CASSETTE TAPE WITH GUIDERAILS ON CASSETTE HOLDER APPARATUS

BACKGROUND OF THE INVENTION

1. Field of the Invention

This invention relates generally to tape cassettes and to the cassette holders of cassette tape recording and/or reproducing apparatus of the front-loading type in which tape cassettes of different sizes can be selectively employed.

2. Description of the Prior Art

In a known cassette tape recording and/or reproducing apparatus capable of selectively employing tape cassettes of different sizes, for example, as disclosed in U.S. Pat. No. 3,735,939, having a common assignee herewith, a cassette holder movable between a raised cassette receiving and discharging position and a lowered cassette loading position is provided with a single, substantially laterally centered guide rail that extends parallel to the direction in which a cassette is slidably inserted into, or removed from the holder with the latter in its raised position. Each cassette, whether of large size or small size, is provided with a substantially centered guide groove in its bottom surface for slidably receiving the guide rail of the holder when the respective cassette is inserted into the holder so as to correctly position the cassette relative to the holder.

It will be apparent that, in the foregoing arrangement according to the prior art, each of the cassettes of different sizes has to be provided with a substantially laterally centered guide groove in its bottom surfaces for suitably positioning either the small-sized or large-sized cassette in the cassette holder. However, many cassettes that are currently available commercially and could be economically used as the small- sized cassettes do not have an approximately laterally centered guide groove in the bottom surface and, hence, cannot be used in the described arrangement according to the prior art for permitting the use of cassettes of different sizes in a cassette tape recording and/or reproducing apparatus. Therefore, in order to use the currently commercially available cassettes as the relatively small-sized cassettes according to the known arrangement, each currently available cassette would have to be additionally processed to provide the laterally centered guide groove in its bottom surface. It is apparent that such additional processing of each currently available cassette would be both costly and difficult.

OBJECTS AND SUMMARY OF THE INVENTION

Accordingly, it is an object of this invention to provide a tape cassette recording and/or reproducing apparatus capable of selectively employing cassettes of different sizes without encountering the described disadvantages of the prior art.

More specifically, it is an object of this invention to provide a tape cassette recording and/or reproducing apparatus capable of selectively employing at least a large-sized cassette and also a small-sized cassette which, if desired, may be of a type currently available commercially without modification.

In accordance with an aspect of this invention, a relatively large-sized tape cassette is provided having a width measured in a transverse direction larger than the similarly measured width of a standard, relatively small-sized tape cassette and which is adapted to be selectively loaded, in place of the standard cassette, into a tape cassette recording and/or reproducing apparatus, such large-sized tape cassette having a bottom surface with a plurality of grooves therein spaced apart in the transverse direction by a distance equal to the width of the standard, relatively small-sized cassette, and extending at right angles to the respective transverse direction.

In accordance with another aspect of this invention, the tape cassette recording and/or reproducing apparatus capable of selective operation with either the large-sized cassette or the standard, relatively small-sized cassette comprises a cassette holder movable between a cassette receiving and discharging position and a cassette loading position, a pair of parallel guide rails on the cassette holder which are spaced apart laterally for slidable reception in the grooves of the large-sized cassette so as to position the latter in respect to the holder in the loading position and so as to guide the large-sized cassette in and out of the holder in the receiving and discharging position, and confronting surfaces on the guide rails which are spaced apart by the width of the small-sized cassette so that such confronting surfaces are slidably engageable with opposed side surfaces of the small-sized cassette for positioning the latter in respect to the holder in the loading position and for guiding the small-sized cassette in and out of the holder in the receiving and discharging position.

The above, and other objects, features and advantages of the invention, will be apparent in the following detailed description of an illustrative embodiment of the invention which is to be read in connection with the accompanying drawings wherein corresponding parts are identified by the same reference numerals in the several views.

BRIEF DESCRIPTION OF THE DRAWINGS

FIG. 4 is a sectional view taken along the line IV—IV on FIG. 2, but showing the cassette holder containing the large-sized cassette in its loading position; and FIG. 5 is a view similar to that of FIG. 4, but showing the small-sized cassette situated in the cassette holder.

DESCRIPTION OF THE PREFERRED EMBODIMENT

Figure 1:
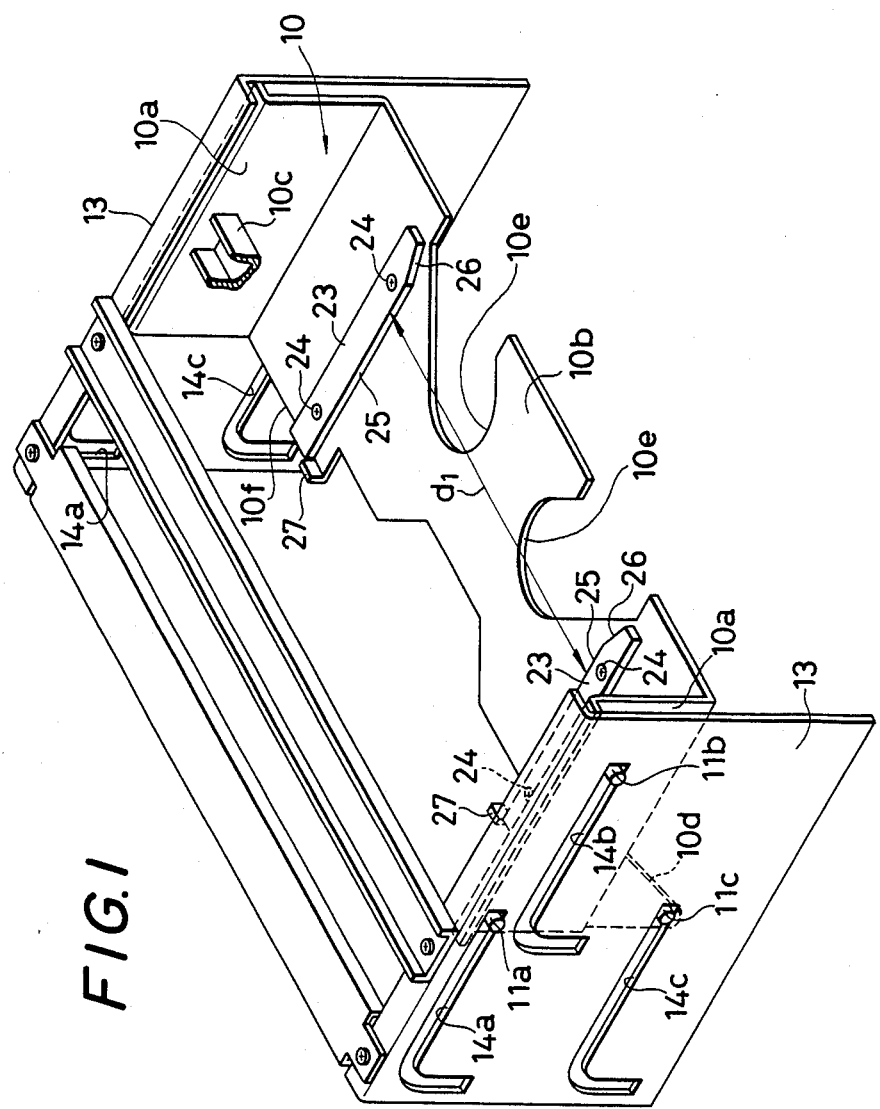
FIG. 1 is a perspective view, partly broken away and in section, of a cassette holder included in a tape cassette recording and/or reproducing apparatus according to an embodiment of the invention.

Referring to the drawings in detail, it will be seen that, in accordance with this invention, there are provided a large-sized cassette 1 (FIGS. 2 and 4) and a small-sized cassette 2 (FIGS. 3 and 5) which may be of a currently commercially available type, for example, of the type employed in Beta-type cassette VTRs. Each of the cassettes 1 and 2 contains a pair of rotatable reels conventionally arranged side-by-side, and one of which is indicated at R on FIG. 4. The cassettes 1 and 2 are substantially rectangular and have equal thicknesses $T_1$ and $T_2$ (FIGS. 2 and 3), while the large-sized cassette 1 has a width $W_1$ measured in the transverse direction (FIG. 2) and a depth or dimension $D_1$ measured at right angles to the transverse direction (FIG. 4) that are substantially larger than the width $W_2$ and depth $D_2$, respectively, (FIGS. 3 and 5) of the small-sized cassette 2. Thus, the reels contained in cassette 1 can be spaced further apart and of substantially larger diameter than those contained in cassette 2 so as to permit a substantially larger amount of tape to be wound on the reels in cassette 1 than is wound on the reels contained in cassette 2. Cassettes 1 and 2 have openings $O_1$ and $O_2$, respectively, extending across the back of the respective cassette for affording access to the tape within the cassette, and lids 3 and 4 (FIGS. 4 and 5) are pivotally mounted at the back portions of cassettes 1 and 2, respectively, for swinging movements in the direction of the arrows C between closed positions covering the openings $O_1$ and $O_2$, and the illustrated raised, opened positions (FIGS. 4 and 5).

In accordance with the present invention, the large-sized tape cassette 1 is formed, in its bottom surface 1a, with a plurality of grooves 5 (FIGS. 2 and 4) which are spaced apart in the transverse direction by a distance $w_1$ approximately equal to the width $W_2$ of the small-sized cassette 2. Such grooves 5 are parallel to each other and extend at right angles to the transverse direction of the cassette 1. Further, as shown on FIG. 4, each of the grooves 5 has a length $L_1$ substantially smaller than the depth $D_1$ of the cassette 1 and extends from a back edge 1b at the bottom of cassette 1 which, at least in part, defines the opening $O_1$. The grooves 5 are open only at the back ends 5a thereof, that is, only at the ends corresponding to the edge 1b, while the forward ends 5b of the grooves are closed.

Figure 3:
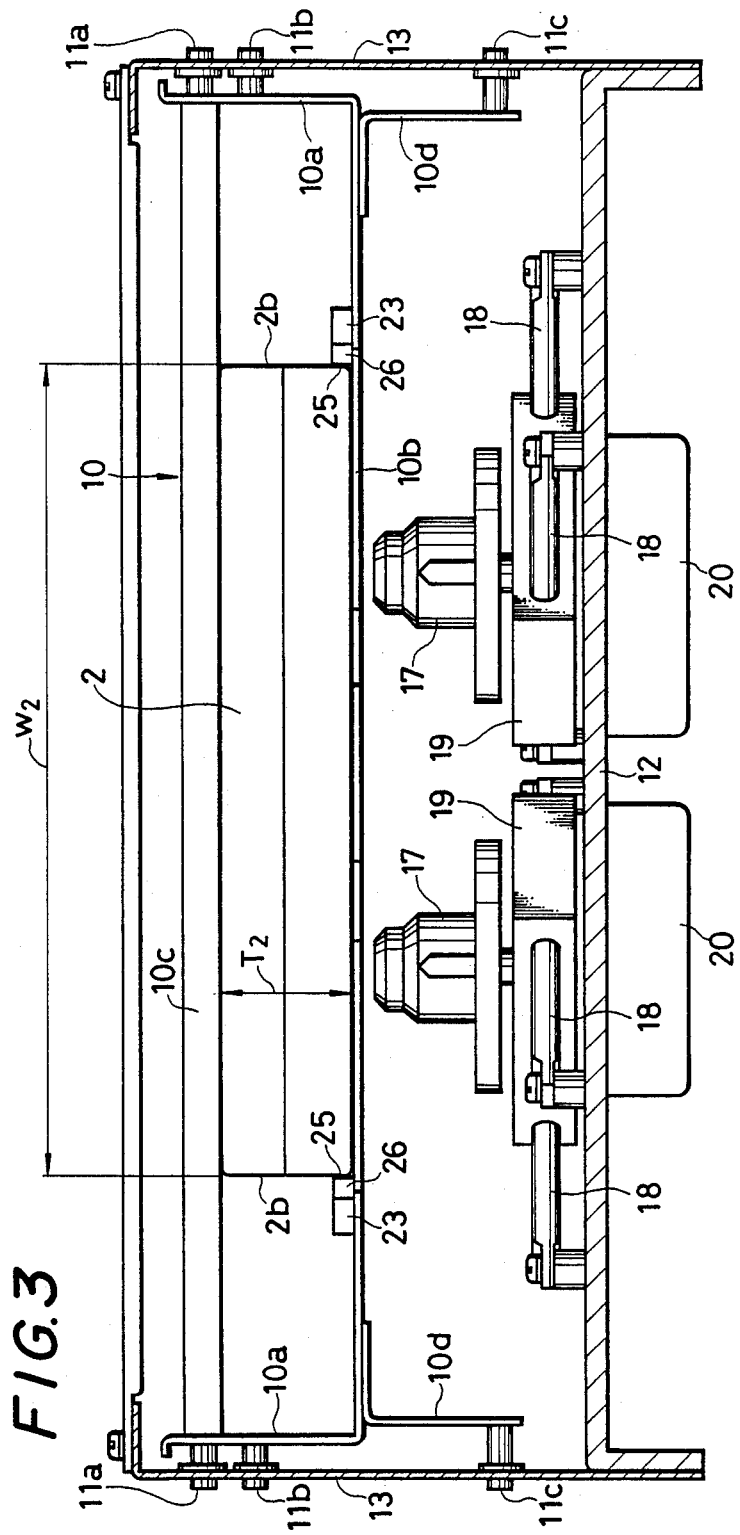
FIG. 3 is a front elevational view similar to that of FIG. 2, but showing a small-sized cassette positioned in the cassette holder according to this invention.

As distinguished from the foregoing, the small-sized cassette 2, which as noted above may be a commercially available cassette for use in Beta-type VTRs, is used without modification, and thus does not have any grooves in the bottom surface 2a thereof, as shown on FIG. 3.

A tape cassette recording and/or reproducing apparatus capable of selective operation with either the large-sized cassette 1 or the small-sized cassette 2 includes a cassette holder 10 formed of sheet metal and having side portions 10a directed upwardly from the opposite side edges of a bottom support plate 10b, and a bracing member 10c extending between side portions 10a adjacent the back of holder 10 and being spaced upwardly from support plate 10b. It will be apparent from FIG. 2 that cassette holder 10 is large enough to accommodate the large-sized cassette 1, and hence also the small-sized cassette 2. More particularly, the lateral distance between side portions 10a of holder 10 is shown to be larger than the width $W_1$ of the large-sized cassette 1, while the vertical distance between support plate 10b and the underside of bracing member 10c is at least slightly larger than the thicknesses $T_1$ and $T_2$ of cassettes 1 and 2, respectively.

Each of side portions 10a of holder 10 has guide rollers 11a and 11b directed outwardly therefrom, and a third guide roller 11c, at each side of the cassette holder, is directed outwardly from the lower end of a bracket 10d depending from the respective side portion of support plate 10b. Guide rollers 11a, 11b and 11c are movable along guide slots 14a, 14b and 14c, respectively, formed in vertically directed side plates 13 which are suitably fixed, at their lower portions, to the opposite sides of a chassis 12 (FIGS. 2 and 3) and which extend upwardly from the latter. Th guide slots 14a, 14b and 14c each have a relatively long horizontally extending portion from which, at the back end, a vertical portion depends. Thus, cassette holder 10 is guided by guide rollers 11a, 11b and 11c and guide slots 14a, 14b and 14c for reciprocal movements in the directions indicated by the arrows a and b on FIGS. 4 and 5 along a generally inverted L-shaped path between a raised cassette receiving and discharging position (FIGS. 1, 2 and 3), and a lowered cassette loading or mounting position (FIGS. 4 and 5). It will be appreciated that the bottom support plate 10b of holder 10 remains horizontal during its movements between the cassette receiving and discharging position and the cassette loading position. Further, in the cassette receiving and discharging position, support plate 10b is substantially at the level of the bottom edge of a port 16 provided in a front panel 15 of the apparatus, and the open front of holder 10 is then disposed immediately in back of opening or port 16 so that a cassette 1 or 2 can be slidably inserted through port 16 into holder 10. On the other hand, in the lowered cassette loading or mounting position, the cassette 1 or 2 in holder 10 is moved rearwardly and downwardly onto a pair of reel tables 17 which project upwardly through cutouts 10e (FIG. 1) in support plate 10b and engage in the hubs (not shown) of the supply and take-up reels in cassette 1 or 2.

Figure 2:
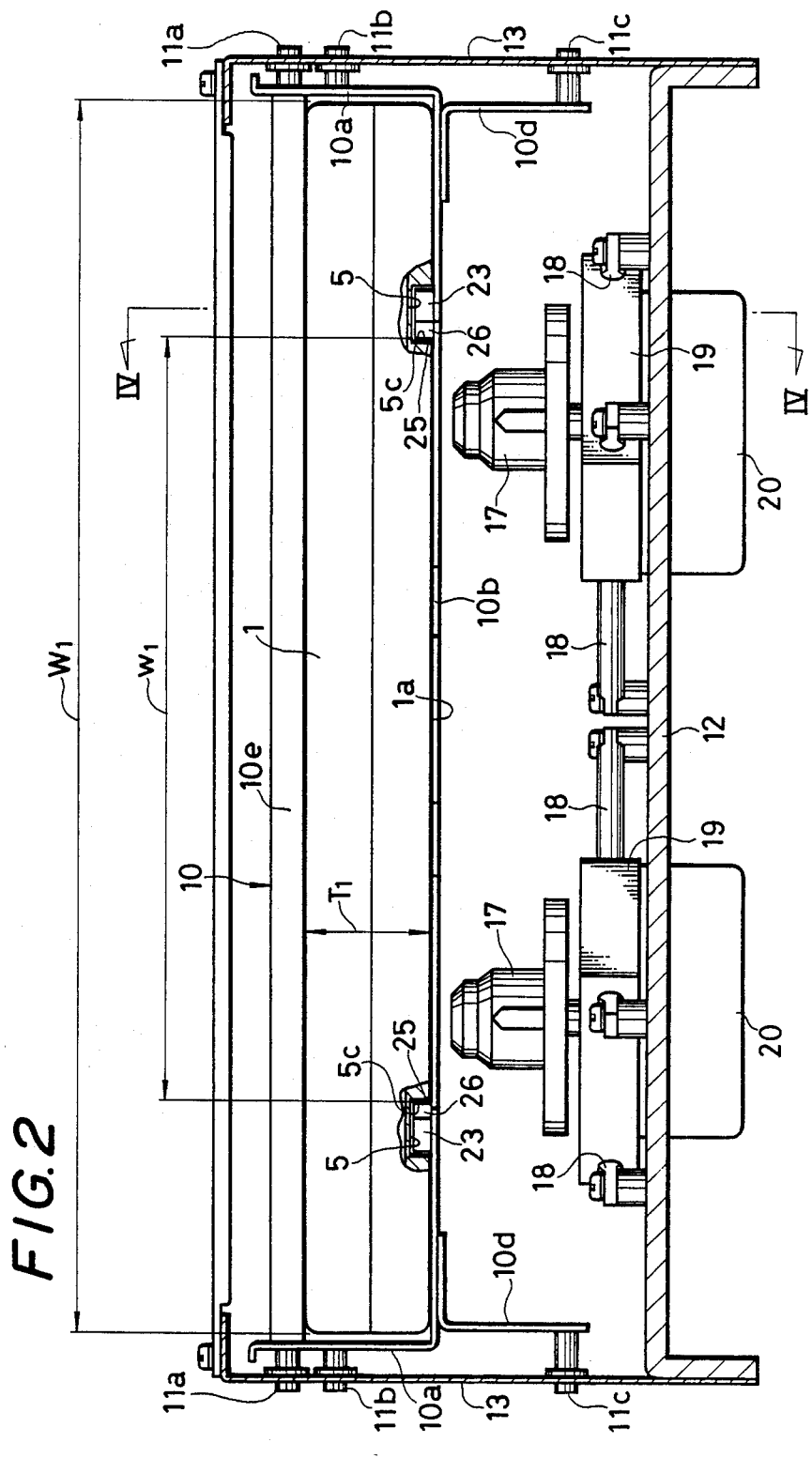
FIG. 2 is a front elevational view of the cassette holder shown in its raised cassette receiving and discharging position and with a large-sized cassette positioned therein according to this invention.

As shown on FIGS. 2 and 3, the reel tables 17 are rotatably mounted on support blocks 19 which are reciprocable along respective horizontally disposed guide rails mounted on chassis 12. Further, each support block 19 carries a motor 20 for rotatably driving the respective reel table 17. A holder driving mechanism (which is not related to the present invention and hence not shown) may be provided to selectively drive holder 10 between its raised, cassette receiving and discharging position and its cassette loading or mounting position. Further, a mechanism (which also bears no relation to the present invention and is not shown) may be desirably provided for responding to the size of the cassette 1 or 2 inserted into holder 10 when the latter is in its cassette receiving and discharging position, and for suitably positioning reel tables 17 for engagement with the reels contained within the inserted cassette. Thus, for example, when a large-sized cassette 1 is inserted into cassette holder 10, as shown on FIG. 2, the distance between reel tables 17 is increased to correspond to the distance between the axes of the reels contained within the large-sized cassette 1. On the other hand, when a small-sized cassette 2 is inserted, as shown in FIG. 3, the distance between the axes of reel tables 17 is decreased to correspond to the relatively smaller distance provided between the axes of the reels in small-sized cassette 2. It is also to be noted that, when a large-sized cassette 1 is inserted in holder 10, the reel tables 17 are in relatively forward positions so as to be adjacent to the forward edge of support plate 10b with holder 10 in its cassette loading position (FIG. 4), whereas, reel tables 17 are rearwardly displaced from the forward edge of support plate 10b in the loading position of cassette holder 10 when the latter contains a small-sized cassette 2 (FIG. 5).

In accordance with the present invention, a pair of parallel, laterally spaced apart guide rails 23 are secured on the upper surface of support plate 10b of holder 10, as by screws 24. The guide rails 23 are desirably formed of molded synthetic resin. The rails 23 extend parallel to the direction of movement of holder 10 and are symmetrically disposed in respect to the middle of holder 10. Further, in accordance with the present invention, guide rails 23 are laterally spaced relative to each other so that the lateral distance $d_1$ (FIG. 1) between the confronting surfaces 25 of guide rails 23 is substantially equal to the distance $w_1$ between the grooves 5 in the bottom surface of large-sized cassette 1 and also substantially equal to the width $W_2$ of the small-sized cassette 2. As shown particularly on FIG. 1, the forward end portions of confronting surfaces 25 on guide rails 23 diverge from each other, as at 26, for facilitating the entry of a cassette 1 or 2 into holder 10.

As shown on FIG. 2, when a large-sized cassette 1 is selectively inserted in cassette holder 10, guide grooves 5 in the bottom surface 1a of cassette 1 slidably receive guide rails 23 and the surfaces 5c at the laterally inner sides of grooves 5 slidably engage the confronting or positioning surfaces 25 on guide rails 23 for thereby accurately positioning cassette 1 in the lateral direction relative to holder 10. Further, as shown on FIG. 4, the length $L_1$ of each of the guide grooves 5 in the large-sized cassette 1 is approximately equal to the length of the guide rails 23. Since guide grooves 5 in the bottom surface 1a of large-sized cassette 1 only open at the back edge 1b of the bottom of cassette 1, that is, guide grooves 5 only open at the ends thereof adjacent opening $O_1$ of the cassette, it will be apparent that cassette 1 can be inserted in holder 10 only with opening $O_1$ and lid 3 directed towards the back, that is, with opening $O_1$ in leading relation when cassette 1 is inserted into holder 10. If the large-sized cassette 1 is inserted into port 16 with lid 3 at the foremost or trailing part of the cassette, guide rails 23 will prevent the insertion of the erroneously oriented cassette 1 into holder 10.

When a small-sized cassette 2 is selectively inserted in the horizontal direction through port 16 into holder 10 in its raised cassette receiving and discharging position, the opposite side surfaces 2b of cassette 2 are guided by the rearwardly converging end portions 26 of confronting surfaces 25 so as to engage between the surfaces 25 of guide rails 23 and thereby be accurately positioned in the lateral direction relative to holder 10.

As is shown particularly on FIG. 1, the support plate 10b of holder 10 has stop elements, for example, in the form of tabs 27, directed upwardly between guide rails 23 from the back edge 10f of support plate 10b. Thus, when a large-sized cassette 1 is inserted into holder 10, the edge 1b of the bottom 1a of the cassette which defines, at least in part, the opening $O_1$, and which is in leading relation during insertion of the cassette into the holder, engages the stop elements or tabs 27 for precisely locating lid 3 and opening $O_1$ relative to holder 10 in the forward and rearward direction. Similarly, when a small-sized cassette 2 is inserted into holder 10, the edge of the bottom surface of the cassette which is in leading relation and which defines, at least in part, the opening $O_2$ is engageable against tabs 27 for precisely locating opening $O_2$ and lid 4 relative to the holder. Accordingly, when holder 10 is moved to its lowered cassette loading or mounting position with either a large-sized cassette 1 or a small-sized cassette 2 in the holder 10, the lid 3 or 4 and the opening $O_1$ or $O_2$ of such cassette is precisely located relative to the holder for ensuring that a conventional lid opening device (not shown) will properly engage the lid 3 or 4 for opening the latter in the direction of the arrow C on FIGS. 4 and 5. The accurate positioning of the cassette 1 or 2 relative to the holder 10 further ensures that the size of the cassette will be reliably sensed for causing the proper adjustment of the positions of the reel tables 17 for engagement with the reels in cassette 1 or 2, as previously described.

In the above described embodiment of the invention, the confronting or laterally inwardly directed surfaces 25 of guide rails 23 serve to laterally position the small-sized cassette 2 by engagement with the side surfaces 2b of such cassette, and also to laterally position the large-sized cassette 1 by engagement with the surfaces 5c at the inner sides of guide grooves 5. However, if desired, the guide grooves 5 can be laterally located or dimensioned in the bottom surface of large-sized cassette 1 so that the outwardly facing sides of rails 23 are slidably engageable with the side surfaces of grooves 5 at the outer sides of the latter for laterally locating the large-sized cassette 1 in the holder 10. In such case, the inner or confronting surfaces 25 of rails 23 would ptill serve to locate a small-sized cassette 2 by engagement with the opposite side surfaces of the latter Although the present invention has been described as having particular application to the holder of a cassette VTR, it will be appreciated that the invention can be similarly applied to various cassette mounting devices in other cassette recording and/or reproducing apparatus, such as, data processing apparatus and the like.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A tape cassette recording and/or reproducing apparatus capable of selective operation with at least a large-sized cassette or a small-sized cassette having differenet respective widths each measured in a transverse direction, said large-sized cassette having a bottom surface with a plurality of grooves therein spaced apart in the respective transverse direction and each extending at right angles to said transverse direction, said appratus comprising:

a cassette holder movable between a cassette receiving and discharging position and a cassette loading position;

two parallel guide rails on said cassette holder, said guide rails being spaced apart laterally for slidable reception in the grooves of said large-sized cassette so as to position the latter in respect to said holder in said loading position of the latter, and so as to guide said large-sized cassette in and out of said holder in said receiving and discharging position; and confronting surfaces on said two guide rails which are spaced apart by the width of said small-sized cassette so that said confronting surfaces are slidably engageable with opposed side surfaces of said small-sized cassette for positioning the latter in respect to said holder in said loading position and for guiding said small-sized cassette in and out of said holder in said receiving and discharging position.

2. A tape cassette recording and/or reproducing apparatus according to claim 1; further comprising a panel extending at right angles to said guide rails in front of said holder and having a port through which a large-sized or small-sized cassette can travel parallel to said guide rails when being inserted in, or discharged from said holder in said cassette receiving and discharging position; and in which said holder includes a substantially horizontal support plate from whic said guide rails project upwardly and which is substantially at the level of the bottom of said port in said cassette receiving and discharging position of the holder so that a large-sized or small-sized cassette travelling through said port is slidable at its respective bottom surface over said support plate while being laterally guided by said guide rails.

3. A tape cassette recording and/or reproducing apparatus according to claim 2; in which each of said large-sized and small-sized cassettes has an opening for access to tape within the respective cassette and such opening is defined, at least in part, by an edge of said bottom surface of the cassette which is to be in leading relation during insertion of the cassette into said holder; and in which said support plate has stop means directed upwardly between said guide rails from a back edge of said support plate for engagement by said edge of the large-sized or small-sized cassette inserted into the holder for precisely locating the cassette opening relative to said holder in said cassette loading position.

4. A tape cassette recording and/or reproducing apparatus according to claim 3; in which said stop means includes two upwardly directed tabs extending from said back edge adjacent said confronting surfaces of the guide rails.

5. A tape cassette recording and/or reproducing apparatus according to claim 3; in which said guide rails have a length substantially smaller than the dimension of the large-sized cassette measured parallel to said grooves and said guide rails extend forwardly from said back edge of the support plate; and in which said grooves of the large-sized cassette have a length approximately equal to said length of the guide rails and extend from said edge of the bottom surface to permit insertion of said large-sized cassette into said holder only with said edge of its bottom surface in said leading relation.

* * * * *